United States Patent [19]

Fukumoto

[11] Patent Number: 4,814,968

[45] Date of Patent: Mar. 21, 1989

[54] SELF-TUNING PROCESS CONTROLLER

[75] Inventor: Shoji Fukumoto, Warminster, Pa.

[73] Assignee: Fischer & Porter Company, Warminster, Pa.

[21] Appl. No.: 109,325

[22] Filed: Oct. 19, 1987

[51] Int. Cl.$^4$ .............................................. G05B 13/00
[52] U.S. Cl. ...................................... 364/150; 364/177
[58] Field of Search ............................ 364/148–151, 364/177, 160–163; 318/600, 601, 636, 592, 561

[56] References Cited

U.S. PATENT DOCUMENTS

| | | | |
|---|---|---|---|
| 4,054,780 | 10/1977 | Bartley et al. | 364/150 |
| 4,448,736 | 5/1984 | Emery et al. | 364/149 |
| 4,451,878 | 5/1984 | Shigemasa | 364/151 |
| 4,639,853 | 1/1987 | Rake et al. | 364/149 |
| 4,758,943 | 7/1988 | Astrom et al. | 364/148 |

Primary Examiner—Allen MacDonald
Attorney, Agent, or Firm—Michael Ebert

[57] ABSTRACT

An industrial process control system in which an electronic controller acts in a controlled process subject to process "dead time" to maintain a process variable at a desired value. Applied as inputs to the controller are signals representing the process variable and a set point, the controller yielding an output signal that reflects the deviation of the process variable from the set point and acts to adjust a final control element in the system to cause the process variable to conform to the set point. To effect self-tuning of the controller, a microprocessor is provided which is responsive to the process variable signal and the output signal from the controller and functions while the controller is operating to identify in a discrete-time process model parameter-identifier the process dead time and the process parameters, and to compute tuned controller parameters, and to transfer the calculated controller parameters to the controller so that the controller can be tuned to prevailing process conditions.

2 Claims, 2 Drawing Sheets

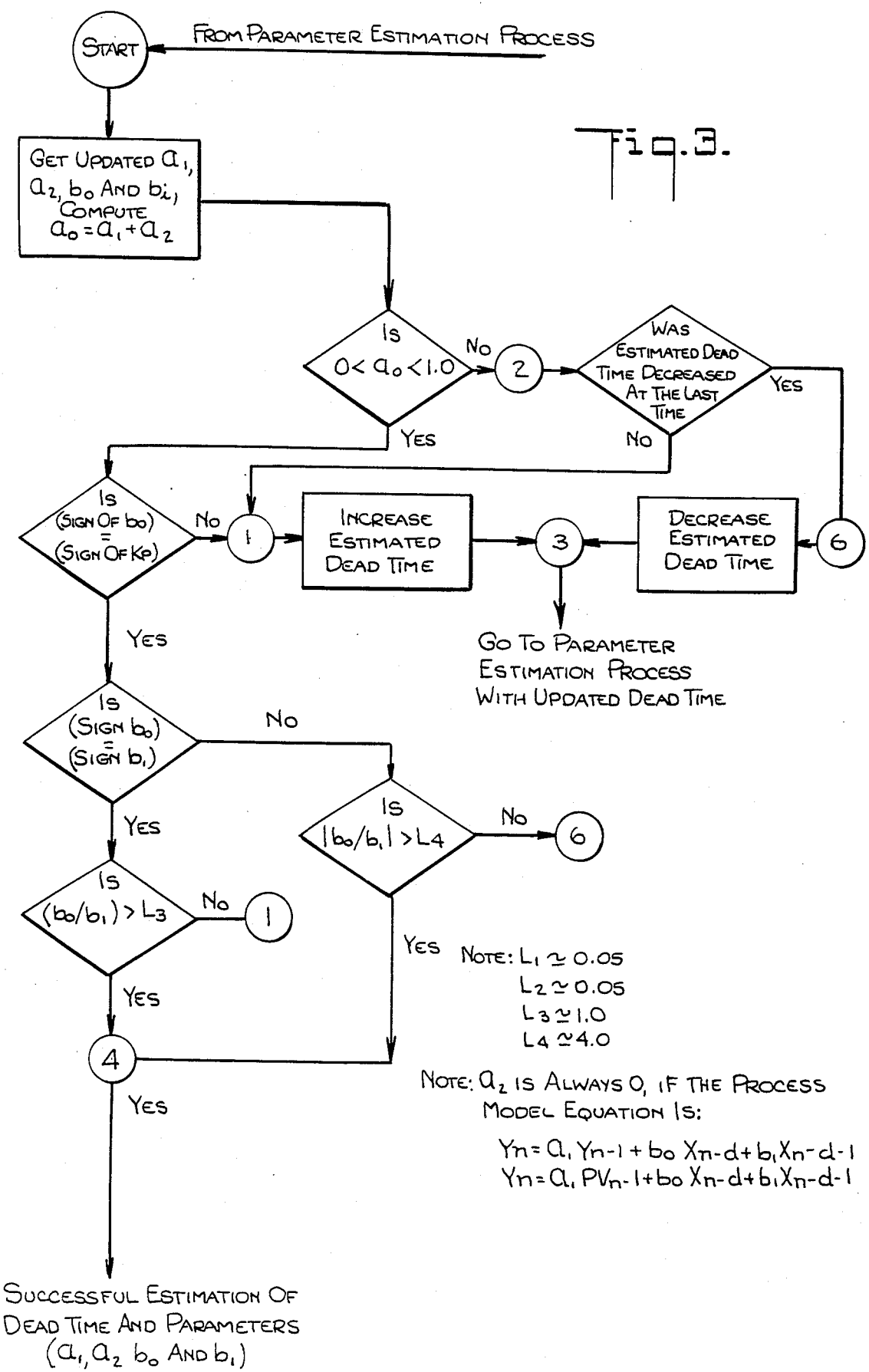

SELF-TUNING PROCESS CONTROLLER

BACKGROUND OF THE INVENTION

1. Field of Invention

This invention relates generally to an industrial process control system in which an electronic controller compares a process variable signal with a set point signal to produce an output signal that adjusts a final control element regulating the process, and more particularly to a system of this type in which the controller is self-tuning and takes into account process "dead time."

2. Status of Prior Art

An electronic controller is a component in a process control closed loop that is subject to disturbances, the controller acting in conjunction with other devices to maintain a process variable at a desired value. The variable controlled may be be flow rate, pressure, viscosity, liquid level, or any other process variable. In operation, the electronic controller receives, in terms of corresponding input signals, both the process variable and a set point, and it compares these signals to produce an output signal that reflects the deviation of the process variable from the set point. This output signal, when applied to a final control element in the loop will directly or indirectly govern the process variable.

Thus one input signal to a controller may be derived from a flowmeter whose reading is converted into a corresponding electrical value, and the output signal may be impressed on a flow-regulating valve which is caused to assume an intermediate position between open and closed at which the flow rate conforms to the set point. The set point generator may be an internal component of the controller or a remotely-controlled device.

Variations in controller action are obtained by adjustment of parameters associated with the control modes and are available in several combinations. These modes of control action which are combined to adjust the controller output signal are known as proportional, reset and derivative.

Proportional action produces an output signal proportional to the deviation of the controlled process variable from the set point. The amount of deviation in terms of percentage required to move the final control element through the full range is known as the proportional band. Automatic reset action, also known as integral action, produces a corrective signal proportional to the time integral value of the deviation of the controlled process variable from the set point, while derivative action, also known as rate action, produces a corrective signal proportional to the rate at which the controlled variable is changing. Manual reset action is an operator-actuated potentiometer controlled to produce a corrective signal directly proportional to the magnitude of the adjustment.

The typical industrial process includes operating elements whose characteristics are such as to introduce delays or retards in the value of the process variable. These delays and retardations are termed process time lags and arise from capacitance, resistance and dead time effects.

To illustrate the nature of process time lags, we shall assume a controlled process in which water in a tank is heated by coils, the temperature of the water in the tank being sensed by an electronic thermocouple which generates a process variable signal. The temperature of process water in the tank which is raised by the steam flow supplied thereto is reduced by cold water fed into the tank. The steam flow is under the control of a controller. The controller compares the process variable signal from the thermocouple with a set point signal to produce an output signal that adjusts the steam valve to bring the temperature to the set point.

Because the walls of both the tank and the steam coils and the water in the tank are capable of storing heat energy, this energy-storing characteristic gives these parts in the process the capacity (C) to retard change. Those parts of the process which resist the transfer of energy between capacities are termed resistance (R). Thus since the coils carrying the steam are immersed in water, the walls of these coils and the insulating effect of the steam and water on either side of the walls resist the transfer of energy between the steam in the coils and the water outside the coils. The combined RC effect of supplying a capacity through a resistance constitutes a process lag time constant.

In the example given above, process water in the tank is heated by steam whose flow is controlled by the controller. However, some time will elapse before the temperature change caused by the steam flow adjustment reaches the thermocouple to cause a change in the process variable. This time lag is not just a slowing down of change but a discrete time delay or "dead time" during which no change whatever occurs. The length of the dead time depends on both the velocity with which this change is transported and the distance over which it is carried.

It is known in a process control system to provide a self-tuning controller which takes into account controlled parameters such as $K_p$ (process gain), $T_p$ (process time constant) and D (process dead time) and adjusts the controller parameters based on the identification of these parameters.

Thus in the article "Microprocessor-based Adaptive Speed and Position Control for Electrical Driver" which appears in Vol. 1A-21, No. 5, September/October 1985 issue of the IEEE Transactions on Industry Applications, a control system is disclosed in which a recursive algorithm is used to identity the controlled process.

It has been found that this known recursive algorithm applied to a self-tuning algorithm has distinct drawbacks; for if the present dead time D is a factor of two different from the actual dead time, the calculations for parameters $K_p$ and $T_p$ were then found to be quite different from the actual values; hence were unusable. Moreover, there were instances where the algorithm could not converge on parameter values.

SUMMARY OF INVENTION

In view of the foregoing, the main object of this invention is to provide in a process control system, a self-tuning controller in which the tuning of the controller is based on the identification of controlled process parameters while the controller is operating, so that it takes into account the actual dead time.

More specifically, an object of this invention is to provide a self-tuning controller in which process dead time is estimated from discrete-time model identification parameters.

Also an object of the invention is to provide a self-tuning controller which operates efficiently and reliably.

Briefly stated, these objects are attained in an industrial process control system in which an electronic controller acts in a controlled process subject to process "dead time" to maintain a process variable at a desired value. Applied as inputs to the controller are signals representing the process variable and a set point, the controller yielding an output signal that reflects the deviation of the process variable from the set point and acts to adjust a final control element in the system to cause the process variable to conform to the set point.

To effect self-tuning of the controller, a microprocessor is provided which is responsive to the process variable signal and the ouput signal from the controller and functions while the controller is operating to identify in a discrete-time process model parameter-identifier the process dead time and the process parameters and to compute tuned controller parameters and to transfer the calculated controller parameters to the controller so that the controller can be tuned to prevailing process conditions.

BRIEF DESCRIPTION OF DRAWINGS

For a better understanding of the invention as well as other objects and further features thereof, reference is made to the following detailed description to be read in conjunction with the accompanying drawings, wherein:

FIG. 3 illustrates an algorithm employed in a self-tuning controller in accordance with the invention.

DESCRIPTION OF INVENTION

Figure 1:
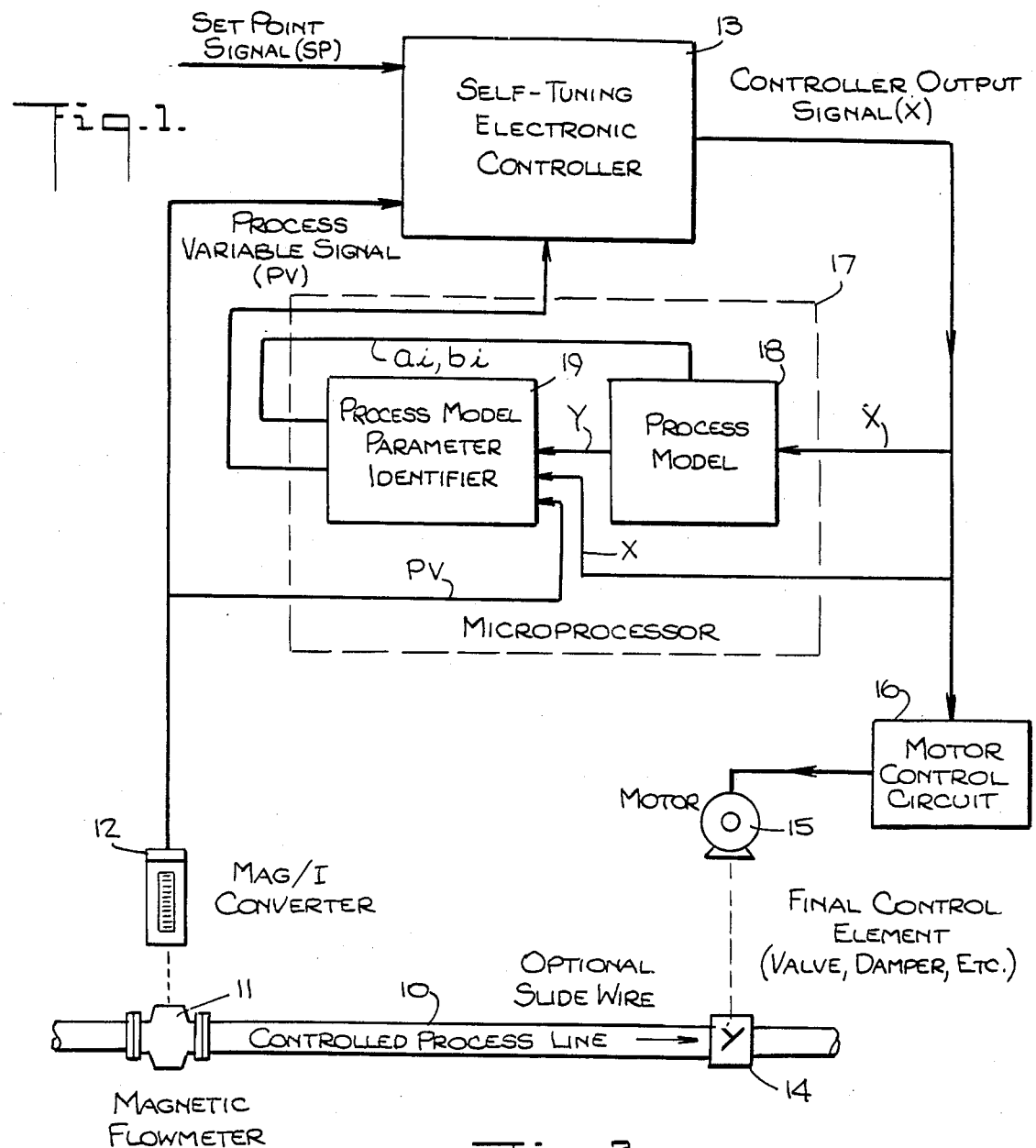
FIG. 1 is a block diagram of a process control system including a self-tuning controller in accordance with the invention.

By way of example, FIG. 1 illustrates an industrial process control loop which acts to control the flow rate of a fluid passing through a controlled line 10, flow rate being sensed by a magnetic flowmeter 11 interposed in this line. The flowmeter output is applied to a converter 12 which yields an electrical signal representing flow rate; hence process variable PV.

The PV signal is applied as one input to a self-tuning electronic controller 13 to whose other input is applied an adjustable set point signal SP. Controller 13 compares the two input signals to produce an output signal X that depends on the direction and extent to which process variable PV deviates from set point SP.

Output signal X acts to govern the operation of a final control element 14 in line 10. This may be a valve or damper driven by a motor 15 controlled by a motor control circuit 16 responsive to output signal X. Motor 15 acts to adjust the final control element in the direction and to the extent required to conform process variable PV to set point SP. Thus the process control system is constituted by a closed loop.

The system also includes a microprocessor 17 to supply controller 13 with controller parameters computed from the identified process dead time and the other parameters so as to tune this controller to the prevailing process dead time. Established within microprocessor 17 is a process model 18 to which the controller output signal X is applied as an input, the output signal Y of process model 18 being applied as one input to a process model parameter identifier 19, to which is also applied as inputs the controller output signal X and the process variable PV. The process model parameter identifier 19 adjusts the process model parameters.

In the present invention, process dead time is identified while controller 13 functions to control the process in a closed loop so that tuning of the controller takes into account the actual process dead time. But before considering the method by which self-tuning is effected in the manner of the present invention, we shall review the manner in which self-tuning was heretofore effected in a controlled process as in the above-identified IEEE system.

The process model is expressed as:

$$Y_n = \sum_{i=1}^{N} a_i Y_{n-i} + \sum_{i=1}^{M} b_i X_{n-i}$$

or $$Y_n = \sum_{i=1}^{N} a_i PV_{n-i} + \sum_{i=1}^{M} b_i X_{n-i}$$

The process model parameter identifier computes the $a_i$ and $b_i$ to minimize $$\sum_{k=1}^{n} (PV_k - Y_k)^2$$

The well known recursive algorithm, as previously indicated, computes updated $a_i$'s and $b_i$'s after a new measurement of the PV signal and the X output signal. Then, the process model parameter identifier makes a decision as to whether or not the new parameters are accurate enough to identify the control process. Normally, the decision is based on the rate of change of the parameters. When the identified parameters are decided to be accurate enough, the identifier computes the contoller's tuning parameters and transfers then into the controller.

In order to implement the self-tuning controller in a microprocessor-based system in accordance with the invention, the process model has to be simple enough to fit in the microprocessor computer power and the available memory. The process model equation is reduced to:

$$Y_n = a_1 Y_{n-1} + b_0 X_{n-d} + b_1 X_{n-d-1}$$

$$Y_n = a_1 PV_{n-1} + b_0 X_{n-d} + b_1 X_{n-d-1}$$

or $$Y_n = a_1 Y_{n-1} + a_2 Y_{n-2} + b_0 X_{n-d} + b_1 X_{n-d-1}$$

$$Y_n = a_1 PV_{n-1} + a_2 PV_{n-2} + b_0 X_{n-d} + b_1 X_{n-d-1}$$

In the above equations:
 $a_1$ and $a_2$ are mainly functions of $T_p$
 $b_0$ and $b_1$ are mainly functions of $K_p$
 d is a function of dead time.

The present invention provides a way to identify the process dead time (d) in the process model parameter identifier.

Figure 2:
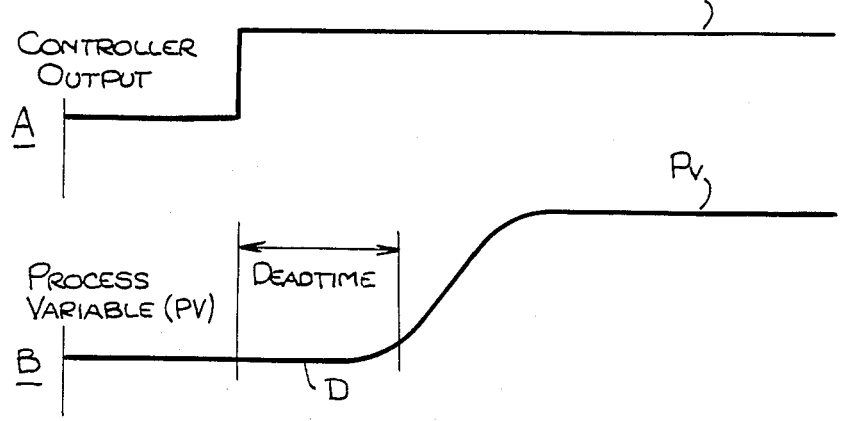
FIG. 2 graphically illustrates the traditional approach to measuring dead time to provide a parameter for transfer to a self-tuning controller.

The conventional approach to self-tuning requires a measurement of dead time by an open loop test. In this test, as illustrated in FIG. 2, line A, the controller operating in manual, a stepped output signal Co is introduced into the open loop. The measured process variable signal PV shown in FIG. 2, line B, does not correspond to the stepped controller signal, for this signal is produced only after a dead time period D has elapsed. The measured process dead time is transferred to the self-tuning controller and the controller will then find the optimum tuning parameters. But these tuning parameters are based on the assumption that the process dead time remains unchanged, which is often not the actual case.

In the present invention, the process dead time is estimated from discrete time model identification parameters. A pre-estimated value of dead time is made, and the resulting discrete time model identification parameters must then satisfy the following conditions:

(A) If $0.0 < a_1 = a_2 < 1.0$ where $a_1$ and $a_2$ are functions of the process time constant.

(B) And if Sign of $(b_0+b_1)=$ Sign of $K_p$ where $K_p$ is the process gain and $b_0$ and $b_1$ are functions of $K_p$ Then (C-1) If sign of $b_0=$ sign of $b_1$ and if $(b_0/b_1)>L_3$ "successful estimating dead time and parameters."

(C-2) If sign of $b_0=$ sign of $b_1$ and if $(b_0/b_1)\leq L_3$ increase estimated dead time and redo parameter estimation.

(C-3) If sign of $b_0 \neq$ sign of $b_1$ and if $(b_0/b_1)>L_4$ "successful estimating dead time and parameters."

(C-4) If sign of $b_0 \neq$ sign of $b_1$ and if $(b_0/b_1)\leq L_4$ decrease estimated dead time and redo parameter estimation.

When the process model parameter identifier 18 decides whether the estimated parameters have been stable or if the estimated $(a_1+a_2)$ value has not stayed in the range for a certain period, the identifier changes the pre-estimated dead time to conform to the prevailing dead time.

The algorithm for changing the pre-estimated dead time in the manner of the present invention is illustrated in FIG. 3.

While there has been shown and described a preferred embodiment of a self-tuning process controller in accordance with the invention, it will be appreciated that many changes and modifications may be made therein without, however, departing from the essential features thereof.

I claim:

1. An industrial process control system for governing a process variable by means of a final control element, said system being subject to process dead time, said system comprising:
   A. means for generating an electrical signal representing a measured value of the process variable to be controlled;
   B. means for generating an electrical signal representing a desired set point of the process variable;
   C. a self-tuning electronic controller for comparing the process variable signal with the set point signal to produce an output signal as a function of the deviation therebetween, and for adjusting said final control element in accordance with said output signal to cause said process variable signal to conform to the set point signal; and
   D. a microprocessor responsive to said process variable signal and said output signal while said controller is operating to identify in a discrete-time process model parameter-identifier the process dead time and the process parameters and to compute tuned controller parameters based on said dead time and to transfer the calculated controller parameters to the controller whereby the controller can be tuned to prevailing process conditions.

2. A system as set forth in claim 1, wherein said microprocessor has established therein a process model to whose input is applied the controller output signal and said process model parameter identifier to whose respective inputs are applied the outputs of the process model, the controller output signal and the measured process variable signal, the identifier yielding the calculated dead time.

* * * * *